Patented Feb. 26, 1935

1,992,547

UNITED STATES PATENT OFFICE 1,992,547

DIATOMACEOUS PRODUCT AND METHOD OF MAKING THE SAME

Clyde C. Schuetz, Somerville, N. J., assignor to Johns-Manville Corporation, New York, N. Y., a corporation of New York No Drawing. Application May 6, 1932, Serial No. 609,769

17 Claims. (Cl. 252—2)

This invention relates to a diatomaceous earth product, particularly to one containing a minimized proportion of soluble material, and to the process of making the same.

One embodiment of the invention comprises the product resulting from and the process of calcining comminuted diatomaceous earth, treating the calcined product with a dilute mineral acid, removing the mineral acid that remains after the treatment, and finally drying and comminuting the product. In the embodiment of the invention that is preferred at this time, comminuted but not calcined diatomaceous earth is treated with a strong mineral acid, suitably sulfuric acid, the treated product is leached with water to remove acid, dried, milled to break up lumps that may have been formed, and calcined. The calcined product is treated with a dilute mineral acid and then again leached, dried, and dispersed by milling, as before.

Diatomaceous earth has come into wide use as a filter aid, that is, a material adapted to facilitate the clarification of liquids by filtration. When used for this purpose diatomaceous earth is preferably in the form of a fine powder which has been milled or comminuted to the degree that the individual diatom frustules are largely separated from one another but are not fractured to an unfavorable extent. Material may be thus comminuted and at the same time dried as described in U. S. Reissue Patent 17,212 to Stockton. Thus, diatomaceous earth in rock form may be broken into small lumps and then passed through a series of high speed blowers for comminuting the material to particle sizes adapted for use as a filter aid.

In addition to the so-called natural material processed as described above, there is also a considerable demand for calcined diatomaceous earth.

Of the calcined material there are two distinct classes.

First, there is the material which is calcined in lump or rock form, as practised in certain parts of Europe, as a means of removal of organic matter, or calcined in a shaped mass, as in making a pressed and fired brick. Also, U. S. Patent 1,184,184 to Krieger describes the calcination of diatomaceous earth in lump form. When the calcined lumps or shapes, such, for example, as those made by the Krieger process, are submitted to a milling operation, there is produced a relatively dense, gritty product which is not adapted for use as a filter aid.

When, on the other hand, the calcination is made in accordance with the process described in U. S. Patent 1,477,394 to Thatcher, there is produced a material adapted for use as a filter aid. In the process of Thatcher the diatomaceous earth is comminuted, that is, disintegrated largely into its constituent diatom frustules before the earth is calcined. During calcination the thus dispersed frustules are not bonded together into a firm, ceramic structure but are only loosely adhered, one to another, if at all. When such a calcined product is submitted to a comminuting or dispersing operation subsequent to the calcination, there results a product of low density which, when used as a filter aid, shows a higher rate of filtration with most liquids than does the same earth that has been comminuted but not calcined. In the Thatcher process described, the diatomaceous earth is calcined in flux-free condition, that is, in the absence of materials, such as sodium carbonate or chloride, added to flux or facilitate sintering of an ingredient of the diatomaceous earth.

Diatomaceous earth in the most important deposits in the United States and also in many other, possibly all, deposits contains an appreciable proportion of water-soluble materials. Thus a high grade diatomaceous earth from the Lompoc, California, deposit may contain as much as ½ percent of water-extractable material. Some of this extractable material may consist of such substances as salt, calcium sulfate, and less soluble materials, including certain clayey compounds, silicates, limestone, and/or opaline silica, along with some small amounts of organic material. When the Lompoc earth is submitted to calcination, as described in the aforesaid patent to Thatcher, there is a decrease in the content of water-soluble or water-extractable material. However, there remains some such material in the calcined product.

It is an object of the present invention to decrease the amount of soluble material to substantially less than the amount present in calcined diatomaceous earth of a usual grade, as measured by the solubility either in water alone or in aqueous solutions of organic or inorganic materials, particularly aqueous solutions of sugar, acids, salts, or the like.

Other objects and advantages will appear from the description that follows.

The invention is illustrated by the following specific examples:

Example 1

High grade diatomaceous earth from an important Lompoc, California, deposit is dried and comminuted to give a material adapted for use as a filter aid and is then digested with a dilute solution of a strong acid, such as a solution of 25 parts by volume of sulfuric acid in 75 parts of water. The amount of sulfuric acid used should be sufficient to wet all of the diatomaceous earth and, suitably, sufficient to permit the formation of a slurry. The mixture is heated to a temperature below the boiling point, as, for example, to a temperature not above approximately 250° F., for a period of approximately 20 minutes or longer. During this treatment some of the acid will be combined with or neutralized by the alkalies and/or other ingredients of the diatomaceous earth. The excess or unused acid remaining after the treatment, is removed in a conventional manner, as, for example, by centrifuging or filtration, followed by leaching or washing with water. The water is preferably used in several portions and the last one or two portions of water used may be soft or distilled water, that is, water containing no undesirable amount of dissolved materials. The washed material is then dried and dispersed or comminuted, the dispersion being preferably made by passing the dried material through one or more high speed blowers.

The product so made still contains a substantial amount of water-soluble material, frequently about 0.10 percent.

By water-soluble material, as used in the specifications and claims, is meant the material which is removable by water, as by stirring the diatomaceous earth product with 20 times its weight of water for about 24 hours and then separating the liquid from the indissolved material.

Example 2

Material made as described in Example 1 is calcined at approximately 1800° F. and then again comminuted, as described in the above mentioned patent to Thatcher.

The calcination lowers the proportion of the soluble material to less than the amount present in the product described under Example 1.

The calcined product is nearly white in color.

Example 3

Material made as described in Example 2, with the exception that the comminution following calcining may be omitted in some cases, is subjected to an additional acid treatment followed by washing, drying, and comminuting. The acid used for this treatment subsequent to calcination is suitably a dilute, aqueous solution of a mineral acid, such as 1 or 2 percent hydrochloric acid solution. The acid is used in sufficient amount to wet thoroughly the calcined earth and in excess of the amount required to react with acid-consuming ingredients. The acid is preferably stirred with the earth in hot condition, that is, at a temperature that is not above the boiling point of the mixture, for a sufficiently long time to allow the acid to react with impurities in the calcined product. Usually an hour is a sufficiently long time to allow for this reaction. After the reaction is complete, excess or unused acid is removed in a conventional manner, suitably by centrifuging or filtering followed by washing with water, as described above in Example 1. The washed material is then dried and comminuted.

A product so made has been found to contain approximately 0.02 percent of water-soluble material.

Example 4

Comminuted natural diatomaceous earth, without any preliminary acid treatment, is calcined as described in the above-mentioned patent to Thatcher and is subsequently treated with a dilute mineral acid, such as hot 1 percent hydrochloric acid solution. The acid treated product is then freed from excess acid and finished as described above, that is, by centrifuging or filtering, then washing with water, next drying, and finally comminuting.

A product so made has been found to contain 0.03 percent of water-soluble material and to have a salmon pink color, suggestive of oxidized iron.

Example 5

Comminuted diatomaceous earth is calcined with 5 percent of soda ash (anhydrous sodium carbonate) or other flux, suitably as described in U. S. Patent 1,502,547 to Calvert, Dern and Alles. The calcined product is then treated with an aqueous solution of a mineral acid, such as hot 10 percent hydrochloric acid solution, and then freed from the excess of acid and finished as described above, as, for example, by centrifuging or filtering, washing with several portions of water, drying, and comminuting. This is not a preferred embodiment of the invention.

A product so made has a readily extractable alkalinity corresponding to 0.001 to 0.003 percent of sodium silicate, by methyl orange indicator, and about 0.3 to 0.5 percent of total water-soluble material.

Example 6

The procedures of any of the Examples 1 to 5, inclusive, may be repeated, with the exception that an air-separated diatomaceous earth may be used as the starting material. The air separation may be effected by drying and comminuting diatomaceous earth, making the comminuted material into a suspension in an aeriform stream, and then passing this stream rapidly through a conventional separating device, as, for example, through a series of cyclones, for classifying the material more or less according to particle size. An effective air separation, that greatly increases the rate at which liquids may be filtered through the diatomaceous earth, is made when approximately half of the total amount of comminuted diatomaceous earth has been removed as a coarse fraction, the excessively fine material being still in suspension in the aeriform stream.

The products made in accordance with the above examples have certain features in common, in addition to a high degree of insolubility in water and other properties that have been mentioned specifically in connection with the several examples. The products are light in weight, finely divided, and of great bulking power. The wet density of the products, (that is, the apparent density determined by suspending the powder in water in a centrifuge tube, centrifuging, and calculating the results as pounds of the solid per cubic foot of settled volume) varies, of course, with the quality of earth used, and the specific treatment given to it. Usually the wet density is below 16 pounds per cubic foot, frequently about 14 pounds, and sometimes as low as 12 pounds for products made from high grade Lompoc earth. The color is usually light or some shade of white, except when the process of Example 4 is used. Silicic acid present in the diatomaceous earth as initially used or formed, during the process, by reaction of the acid added upon some ingredient of the earth, such as a silicate, is dehydrated and insoluble, to a large extent, in the final product. This dehydration is produced by subjecting the acid-treated and washed material to an elevated temperature, say, substantially above 100° C. The result is a high degree of insolubility of both the silica and the non-silica content of the diatomaceous earth, in water and in non-aqueous solutions. Many of the particles of the product retain their diatomic structure, in distinction from the badly broken and fractured particles and gritty, ceramically bonded aggregates obtained by milling diatomaceous earth that has been calcined in lump form or in the form of a pressed and fired shape, such as a brick. Because of the diatomic structure which persists in the treated product and of changes produced during the chemical treatment and calcination, the products made by a process including calcination are adapted to filter liquids, such as raw cane sugar solutions, for example, at a substantially faster rate than the liquids are filtered with the same quality of diatomaceous earth before treatment. For example, the rate of filtration, with the new products that have been calcined during processing, may be 50 to 100 percent or more in excess of the rate of filtration with the comminuted natural earth. Typical analyses of a high grade diatomaceous earth, before and after treatment, say as described under Example 3, follow.

|  | Original diatomaceous earth | Same earth after treatment |
| --- | --- | --- |
|  | Percent | Percent |
| Moisture, loss at 105° C | 3.16 | 0.53 |
| Further loss on ignition | 5.34 | 0.52 |
| Silica, calculated as SiO$_2$ | 84.45 | 94.62 |
| Aluminum, calculated as Al$_2$O$_3$ | 3.75 | 2.53 |
| Iron, calculated as Fe$_2$O$_3$ | 1.10 | 0.50 |
| Titanium, calculated as TiO$_2$ | 0.15 | 0.12 |
| Calcium, calculated as CaO | 0.15 | None |
| Magnesium, calculated as MgO | 0.54 | 0.16 |
| Alkali metals, calculated as Na$_2$O | 0.99 | 0.40 |
| Total | 99.63 | 99.38 |
| Water-soluble | 0.105 | 0.015 |

Another typical product made in accordance with the invention showed 0.30% of material soluble in hot sulfuric acid of specific gravity 1.30, whereas the original earth before treatment showed 1.85% of material soluble under the same conditions of test.

The diatomaceous earth that is preferred is the important deposit of marine origin, containing the frustules of large species of diatoms, located near Lompoc, California. The earth to be used from this deposit is suitably selected from strata containing 92 to 93 percent or more of silica, on the ignited basis. However, other diatomaceous earths may be used, as will be obvious to one skilled in the art. If a product suitable for use as a filter aid is desired, then the raw material selected for the treatment is preferably one that is adapted to serve as a filter aid before treatment, that is, in the comminuted, natural condition.

The proportion of acid to diatomaceaus earth used may be varied within wide limits. However, the amount of acid should be in excess, that is, more than the amount which is required to wet the diatomaceous earth and to react with the acid-consuming ingredients thereof.

The concentration of acid used may be varied also within wide limits. Thus there has been used aqueous sulfuric acid of concentration of acid ranging from 2 to 93 percent. A preferred concentration is 25 parts by volume of sulfuric acid to 75 parts of water, when the sulfuric acid is to be used for treating the diatomaceous earth before calcination, and 2 parts by weight of sulfuric acid to 98 parts of water, when the sulfuric acid solution is to be used to treat the diatomaceous earth subsequent to calcination.

Other acids than sulfuric acid may be used, as, for example, phosphoric acid or hydrochloric acid. With these acids, also, large variations in concentration are allowable. There have been used to advantage, for example, commercial, concentrated hydrochloric acid as well as the other concentrations of hydrochloric acid that have been specified in certain examples.

The chemical treatment, or the digestion of the diatomaceous earth with the acid, may be made either hot or cold, for a long or short time, with one batch only of acid, or with two or more consecutive acid treatments. Thus, a calcined diatomaceous earth product made as described in the above-mentioned patent to Thatcher has been treated, in succession, with 10 percent hydrochloric acid solution and then with 2 percent hydrochloric acid solution, followed by the usual steps of removing the excess of acid, leaching with water, drying, and comminuting.

In general, the effectiveness of the treatment is increased by high temperatures of digestion with acid, with the concentration of the acid (although there is not much need of using concentrations in excess of 25 percent sulfuric acid or 10 percent hydrochloric acid), and with an increase in the length of time of treatment, which length of time, however, does not need usually to exceed 60 minutes. The severity of treatment influences, to a certain extent, the degree of insolubility of the finished product, the whiteness, and occasionally other properties.

The utility of the products as a filter aid has been mentioned. Thus they are particularly useful in filtering certain materials for which previously known filter aids were not entirely satisfactory, as, for example, certain pharmaceutical and other materials requiring a high degree of purity of the filtrate. Also, the products may be used as an analytical filter aid, as, for example, in the filtration of precipitated barium sulfate in a Gooch crucible, in quantitative analysis. Examples of solutions that may be filtered to advantage with the new product are agar-agar solutions, freshly precipitated metastannic acid in nitric acid solution, fermented grape juice, and apple pectin solution. In filtering such solutions the improved insoluble filter aid is added to the solution, as in the proportion of about 1 percent by weight of the solution, and the mixture with suspended filter aid filtered under pressure or suction in conventional equipment. Precoating of the filter member, such as a filter cloth, may be used.

In addition to use as a filter aid, the products of the invention are adapted to many other purposes for which diatomaceous earth is now used, as, for example, an inert filler in various compositions.

Since the details given are for the purpose of illustration, not restriction of the invention, it is intended that the invention should be limited only by the terms of the claims.

What I claim is:

1. A chemically treated, comminuted diatomaceous earth product containing less than 0.03 percent of water-soluble material.

2. An acid digested and calcined diatomaceous earth filter aid containing less than 0.10 percent of water-soluble material and having a wet density of less than 16 pounds per cubic foot.

3. An acid-digested and then calcined diatomaceous earth product containing less than 0.10 percent of water-soluble material and having a wet density of approximately 14 pounds per cubic foot.

4. An acid-digested, comminuted diatomaceous earth product retaining its diatomic structure and adapted for use as a filter aid, said product containing less than 0.10 percent of water soluble material.

5. An air-separated, acid-digested, calcined diatomaceous earth product of a high degree of insolubility in water and in non-alkaline solutions.

6. An acid-digested, calcined diatomaceous earth product of a high degree of insolubility of the silica content thereof in water and of a light color.

7. An air-separated, acid-digested, calcined diatomaceous earth product adapted for use as a filter aid and containing less than 0.1 percent of water-soluble material.

8. The process of preparing a diatomaceous earth product which process comprises calcining a comminuted diatomaceous earth, treating the calcined product with an acid, removing the excess of acid, and subjecting the resulting material to an elevated temperature adapted to cause dehydration of silicic acid.

9. The process of preparing a diatomaceous earth product which process comprises acid-treating a comminuted diatomaceous earth adapted for use as a filter aid, removing the excess of acid, and subjecting the resulting material in flux-free condition to an elevated temperature adapted to cause dehydration of silicic acid.

10. The process of preparing a diatomaceous earth product which process comprises acid-treating a comminuted diatomaceous earth, removing the excess of acid, drying and comminuting the acid-treated material, then calcining the comminuted material, treating the calcined product with additional acid, removing the excess of acid, and, finally, drying and comminuting the resulting product.

11. In the preparation of an insoluble, comminuted diatomaceous earth product that retains its diatomic structure, the process which comprises the steps of comminuting diatomaceous earth, treating it with a hot solution of 25 parts by volume of sulfuric acid in 75 parts of water, removing the excess of acid by a method including washing with water, drying and comminuting the acid-treated material, and then calcining it in flux-free condition.

12. In the preparation of an insoluble, comminuted diatomaceous earth product that retains its diatomic structure, the process which comprises the steps of comminuting diatomaceous earth, treating it with a solution of dilute sulfuric acid, removing the excess of acid, drying and comminuting the acid-treated material, and then calcining it in flux-free condition at a temperature of approximately 1800° F.

13. In the preparation of an insoluble, comminuted diatomaceous earth product that retains its diatomic structure, the process which comprises the steps of comminuting diatomaceous earth, treating it with a solution of dilute sulfuric acid, removing the excess of acid, drying and comminuting the acid-treated material, then calcining it, treating the calcined product with a dilute acid, then removing said dilute acid, and finally drying and comminuting the resulting product.

14. In the preparation of an insoluble, comminuted diatomaceous earth product that retains its diatomic structure, the process which comprises the steps of comminuting diatomaceous earth, treating it with an aqueous solution of an acid of the type of a solution of 25 parts by volume of sulfuric acid in 75 parts of water, removing the excess of acid by a method including washing with water, drying and comminuting the acid-treated material, then calcining it at a temperature of approximately 1800° F., treating the calcined product with a solution of hydrochloric acid in water, then removing said dilute acid, and finally drying and comminuting the resulting product.

15. In the preparation of an insoluble, comminuted diatomaceous earth product that retains its diatomic structure, the process which comprises the steps of comminuting diatomaceous earth, suspending the comminuted diatomaceous earth in an aeriform stream, separating therefrom a substantial proportion of excessively fine particles, and treating the material from which the fine particles have been separated with an excess of a mineral acid, removing the excess of acid by a method including washing with water, drying and comminuting the acid-treated material, then calcining it at a temperature of approximately 1800° F., treating the calcined product with a dilute acid, then removing said dilute acid, and drying and comminuting the resulting product.

16. In the preparation of an insoluble, comminuted diatomaceous earth product that retains its diatomic structure, the process which comprises the steps of comminuting diatomaceous earth, treating it with an excess of mineral acid, removing the excess of acid, drying and comminuting the acid-treated material, then calcining it at a temperature of approximately 1800° F., treating the calcined product with a dilute, volatile, mineral acid, then removing said dilute acid, and drying and comminuting the resulting product.

17. The process of making an insoluble diatomaceous earth product which comprises calcining comminuted diatomaceous earth, treating the calcined product with an excess of dilute mineral acid, removing the excess of acid, and drying the resulting product.

CLYDE C. SCHUETZ.